(12) United States Patent
Fuchs (10) Patent No.: US 10,269,094 B2
(45) Date of Patent: Apr. 23, 2019

(54) METHOD FOR GENERATING A COMPOSITE IMAGE OF AN OBJECT COMPOSED OF MULTIPLE SUB-IMAGES

(71) Applicant: Sakura Finetek U.S.A., Inc., Torrance, CA (US)

(72) Inventor: Frank Fuchs, Moos (DE)

(73) Assignee: SAKURA FINETEK U.S.A., INC., Torrance, CA (US)

( * ) Notice: Subject to any disclaimer, the term of this patent is extended or adjusted under 35 U.S.C. 154(b) by 0 days.

(21) Appl. No.: 14/779,550

(22) PCT Filed: Apr. 17, 2014

(86) PCT No.: PCT/US2014/034477
§ 371 (c)(1),
(2) Date: Sep. 23, 2015

(87) PCT Pub. No.: WO2014/172530
PCT Pub. Date: Oct. 23, 2014

(65) Prior Publication Data
US 2016/0055622 A1    Feb. 25, 2016

(30) Foreign Application Priority Data
Apr. 19, 2013    (DE) .................. 10 2013 103 971

(51) Int. Cl.
*G06K 9/00*       (2006.01)
*G06T 3/40*       (2006.01)
(Continued)

(52) U.S. Cl.
CPC .......... *G06T 3/4038* (2013.01); *G02B 21/367* (2013.01); *G06K 9/342* (2013.01);
(Continued)

(58) Field of Classification Search
USPC ................................................. 382/128–134
See application file for complete search history.

(56) References Cited

U.S. PATENT DOCUMENTS 3,309,262 A    3/1967    Copeland et al.
3,525,803 A    8/1970    Smart
(Continued)

FOREIGN PATENT DOCUMENTS

AU    20030142882    7/2003
CA    2504245    11/2006
(Continued)

OTHER PUBLICATIONS

Sakura Finetek U.S.A., Inc., "Non final office action", AU Application No. 201453889, (dated May 18, 2016).
(Continued)

*Primary Examiner* — Alex Kok S Liew
(74) *Attorney, Agent, or Firm* — William Thomas Babbitt; Leech Tishman Fuscaldo & Lampl (57) ABSTRACT

The invention relates to a method for combining a composite image (4) of an object (8) composed of multiple sub-images (6) by means of so-called stitching. Multiple adjacent sub-images (6) of the object (8) are captured and are stitched by means of an image processing operation together to form a coherent composite image (4). In order to make it possible to stitch the sub-images (6) together in the correct position even in the case of little information about the image, it is proposed that the stitching of the sub-images (6) together to form the composite image in the image processing operation be performed using an optical pattern (30, 74) that is generated by means of a pattern means (44).

22 Claims, 3 Drawing Sheets

(51) Int. Cl.
*G02B 21/36* (2006.01)
*G06K 9/34* (2006.01)
*G06T 5/50* (2006.01)
*G02B 21/16* (2006.01)

(52) U.S. Cl.
CPC ............... *G06T 5/50* (2013.01); *G02B 21/16* (2013.01); *G06T 2207/10024* (2013.01); *G06T 2207/10056* (2013.01); *G06T 2207/20221* (2013.01); *G06T 2207/30004* (2013.01)

(56) References Cited

U.S. PATENT DOCUMENTS

| | | | |
|---|---|---|---|
| 3,765,851 A | 10/1973 | White | |
| 3,862,909 A | 1/1975 | Copeland | |
| 4,000,417 A | 12/1976 | Adkisson et al. | |
| 4,079,248 A | 3/1978 | Lehureau et al. | |
| 4,148,752 A | 4/1979 | Burger et al. | |
| 4,404,683 A | 9/1983 | Kobayashi et al. | |
| 4,477,185 A | 10/1984 | Berger et al. | |
| 4,595,829 A | 6/1986 | Neumann et al. | |
| 4,673,988 A | 6/1987 | Jansson et al. | |
| 4,684,799 A | 8/1987 | Emoto et al. | |
| 4,737,022 A | 4/1988 | Faltermeier et al. | |
| 4,760,385 A | 7/1988 | Jansson et al. | |
| 4,761,075 A | 8/1988 | Matsushita et al. | |
| 4,836,667 A | 6/1989 | Ozeki | |
| 4,958,920 A | 9/1990 | Jorgens et al. | |
| 4,962,264 A | 10/1990 | Forester | |
| 5,287,272 A | 2/1994 | Rutenberg et al. | |
| 5,297,034 A | 3/1994 | Weinstien | |
| 5,297,215 A | 3/1994 | Yamagishi | |
| 5,311,426 A | 5/1994 | Donohue et al. | |
| 5,367,401 A | 11/1994 | Saulietis | |
| 5,428,690 A | 6/1995 | Bacus et al. | |
| 5,473,706 A | 12/1995 | Bacus et al. | |
| 5,530,237 A | 6/1996 | Sato et al. | |
| 5,546,323 A | 8/1996 | Bacus et al. | |
| 5,561,556 A | 10/1996 | Weissman et al. | |
| 5,581,637 A | 12/1996 | Cass et al. | |
| 5,655,028 A | 8/1997 | Soil et al. | |
| 5,659,174 A | 8/1997 | Kaneoka et al. | |
| 5,675,141 A | 10/1997 | Kukihara | |
| 5,686,960 A * | 11/1997 | Sussman ............... | G02B 26/106 348/218.1 |
| 5,696,589 A | 12/1997 | Bernacki | |
| 5,737,084 A | 4/1998 | Ishihara | |
| 5,793,969 A | 8/1998 | Kamentsky et al. | |
| 5,836,877 A | 11/1998 | Zavislan | |
| 5,864,138 A | 1/1999 | Miyata et al. | |
| 5,891,619 A | 4/1999 | Zakim et al. | |
| 5,924,074 A | 6/1999 | Evans | |
| 5,947,167 A | 9/1999 | Bogen et al. | |
| 6,008,892 A | 12/1999 | Kain et al. | |
| 6,031,930 A | 2/2000 | Bacus et al. | |
| 6,043,475 A | 3/2000 | Shimada et al. | |
| 6,061,176 A | 5/2000 | Shih | |
| 6,078,681 A | 6/2000 | Silver | |
| 6,091,075 A | 7/2000 | Shibata et al. | |
| 6,091,842 A | 7/2000 | Domanik et al. | |
| 6,101,265 A | 8/2000 | Bacus et al. | |
| 6,130,745 A | 10/2000 | Manian et al. | |
| 6,147,797 A | 11/2000 | Lee | |
| 6,205,235 B1 | 3/2001 | Roberts | |
| 6,208,374 B1 | 3/2001 | Clinch | |
| 6,215,892 B1 | 4/2001 | Douglass et al. | |
| 6,226,352 B1 | 5/2001 | Salb | |
| 6,226,392 B1 | 5/2001 | Bacus et al. | |
| 6,248,995 B1 | 6/2001 | Tanaami et al. | |
| 6,272,235 B1 | 8/2001 | Bacus et al. | |
| 6,396,941 B1 | 5/2002 | Bacus et al. | |
| 6,404,906 B2 | 6/2002 | Bacus et al. | |
| 6,466,690 B2 | 10/2002 | Bacus et al. | |
| 6,522,774 B1 | 2/2003 | Bacus et al. | |
| 6,529,271 B1 | 3/2003 | Engelhardt | |
| 6,606,413 B1 | 8/2003 | Zeineh | |
| 6,671,393 B2 | 12/2003 | Hays et al. | |
| 6,674,881 B2 | 1/2004 | Bacus et al. | |
| 6,674,884 B2 | 1/2004 | Bacus et al. | |
| 6,678,398 B2 | 1/2004 | Wolters et al. | |
| 6,684,092 B2 | 1/2004 | Zavislan | |
| 6,711,283 B1 | 3/2004 | Soenksen | |
| 6,735,531 B2 | 5/2004 | Rhett et al. | |
| 6,775,402 B2 | 8/2004 | Bacus et al. | |
| 6,800,249 B2 * | 10/2004 | de la Torre-Bueno ..................... | G01N 1/31 382/128 |
| 6,800,853 B2 | 10/2004 | Ohkura | |
| 6,812,446 B2 | 11/2004 | Kreh | |
| 6,834,237 B2 | 12/2004 | Noergaard et al. | |
| 6,838,650 B1 | 1/2005 | Toh | |
| 6,847,481 B1 | 1/2005 | Ludl et al. | |
| 6,847,729 B1 | 1/2005 | Clinch et al. | |
| 6,947,583 B2 | 9/2005 | Ellis et al. | |
| 6,959,720 B2 | 11/2005 | Kurihara et al. | |
| 6,982,741 B2 | 1/2006 | Fiedler | |
| 6,993,169 B2 | 1/2006 | Wetzel et al. | |
| 7,009,638 B2 | 3/2006 | Gruber et al. | |
| 7,016,109 B2 | 3/2006 | Nakagawa | |
| 7,027,627 B2 | 4/2006 | Levin et al. | |
| 7,031,507 B2 | 4/2006 | Bacus et al. | |
| 7,071,969 B1 | 7/2006 | Stimson | |
| 7,098,634 B1 | 8/2006 | Yu | |
| 7,110,586 B2 | 9/2006 | Bacus et al. | |
| 7,110,645 B2 | 9/2006 | Birk et al. | |
| 7,133,545 B2 | 11/2006 | Douglass et al. | |
| 7,136,518 B2 | 11/2006 | Griffin et al. | |
| 7,141,802 B2 | 11/2006 | Takeyama et al. | |
| 7,146,372 B2 | 12/2006 | Bacus et al. | |
| 7,149,332 B2 | 12/2006 | Bacus et al. | |
| 7,171,030 B2 | 1/2007 | Foran et al. | |
| 7,194,118 B1 | 3/2007 | Harris et al. | |
| 7,196,300 B2 | 3/2007 | Watkins et al. | |
| 7,209,287 B2 | 4/2007 | Lauer | |
| 7,212,660 B2 | 5/2007 | Wetzel et al. | |
| 7,224,839 B2 | 5/2007 | Zeineh | |
| 7,233,340 B2 | 6/2007 | Hughes et al. | |
| 7,248,403 B2 | 7/2007 | Nakagawa | |
| 7,250,963 B2 | 7/2007 | Yuri et al. | |
| 7,292,251 B1 | 11/2007 | Gu | |
| 7,297,910 B2 | 11/2007 | Fomitchov | |
| 7,301,133 B2 | 11/2007 | Weiss | |
| 7,349,482 B2 | 3/2008 | Kim | |
| 7,359,548 B2 | 4/2008 | Douglass et al. | |
| 7,391,894 B2 | 6/2008 | Zeineh | |
| 7,394,482 B2 | 7/2008 | Olschewski | |
| 7,394,979 B2 | 7/2008 | Luther et al. | |
| 7,396,508 B1 | 7/2008 | Richards et al. | |
| 7,400,342 B2 | 7/2008 | Gaida et al. | |
| 7,400,983 B2 | 7/2008 | Feingold et al. | |
| 7,406,215 B2 | 7/2008 | Clune et al. | |
| 7,421,102 B2 | 9/2008 | Wetzel et al. | |
| 7,426,345 B2 | 9/2008 | Takamatsu et al. | |
| 7,428,325 B2 | 9/2008 | Douglass et al. | |
| 7,433,026 B2 | 10/2008 | Wolpert et al. | |
| 7,456,377 B2 | 11/2008 | Zeineh et al. | |
| 7,463,761 B2 | 12/2008 | Eichhorn et al. | |
| 7,482,600 B2 | 1/2009 | Seyfried | |
| 7,483,554 B2 | 1/2009 | Kotsianti et al. | |
| 7,486,329 B2 | 2/2009 | Endo | |
| 7,502,519 B2 | 3/2009 | Eichhorn et al. | |
| 7,542,596 B2 | 6/2009 | Bacus et al. | |
| 7,550,699 B1 | 6/2009 | Marshall | |
| 7,584,019 B2 | 9/2009 | Feingold et al. | |
| 7,596,249 B2 | 9/2009 | Bacus et al. | |
| 7,602,524 B2 | 10/2009 | Eichhorn et al. | |
| 7,623,697 B1 | 11/2009 | Hughes et al. | |
| 7,630,113 B2 | 12/2009 | Sase et al. | |
| 7,633,616 B2 | 12/2009 | Hing | |
| 7,642,093 B2 | 1/2010 | Tseung et al. | |
| 7,653,300 B2 | 1/2010 | Fujiyoshi et al. | |
| 7,657,070 B2 | 2/2010 | Lefebvre | |
| 7,663,078 B2 | 2/2010 | Virag et al. | |
| 7,677,289 B2 | 3/2010 | Hayworth et al. | |

(56) References Cited

U.S. PATENT DOCUMENTS

| | | |
|---|---|---|
| 7,689,024 B2 | 3/2010 | Eichhorn et al. |
| 7,738,688 B2 | 6/2010 | Eichhorn et al. |
| 7,756,309 B2 | 7/2010 | Gholap et al. |
| 7,756,357 B2 | 7/2010 | Yoneyama |
| 7,778,485 B2 | 8/2010 | Zeineh et al. |
| 7,822,257 B2 | 10/2010 | Endo et al. |
| 7,840,300 B2 | 11/2010 | Harker |
| 7,856,131 B2 | 12/2010 | Bacus et al. |
| 7,860,292 B2 | 12/2010 | Eichhorn et al. |
| 7,864,414 B2 | 1/2011 | Sase et al. |
| 7,869,641 B2 | 1/2011 | Wetzel et al. |
| 7,873,193 B2 | 1/2011 | De La Torre-Bueno et al. |
| 7,876,948 B2 | 1/2011 | Wetzel et al. |
| RE42,220 E | 3/2011 | Clinch et al. |
| 7,901,941 B2 | 3/2011 | Tseung et al. |
| 7,912,267 B2 | 3/2011 | Kawano et al. |
| 7,916,916 B2 | 3/2011 | Zeineh |
| 7,920,163 B1 | 4/2011 | Kossin |
| 7,925,067 B2 | 4/2011 | Bacus et al. |
| 7,944,608 B2 | 5/2011 | Hayashi et al. |
| 7,949,161 B2 | 5/2011 | Kawanabe et al. |
| 7,957,057 B2 | 6/2011 | Sase et al. |
| 7,967,057 B2 | 6/2011 | Kunii et al. |
| 7,978,894 B2 | 7/2011 | Soenksen et al. |
| 8,000,560 B2 | 8/2011 | Shirota |
| 8,000,562 B2 | 8/2011 | Morales et al. |
| 8,036,868 B2 | 10/2011 | Zeineh et al. |
| 8,074,547 B2 | 12/2011 | Ito et al. |
| 8,077,959 B2 | 12/2011 | Dekel et al. |
| 8,085,296 B2 | 12/2011 | Yuguchi et al. |
| 8,094,902 B2 | 1/2012 | Crandall et al. |
| 8,094,914 B2 * | 1/2012 | Iki ............. G02B 21/24 382/133 |
| 8,098,279 B2 | 1/2012 | Sase et al. |
| 8,098,956 B2 | 1/2012 | Tatke et al. |
| 8,103,082 B2 | 1/2012 | Olson et al. |
| 8,125,534 B2 * | 2/2012 | Shimonaka .......... H04N 5/2251 348/222.1 |
| 8,159,547 B2 | 4/2012 | Kawashima |
| 8,174,763 B2 | 5/2012 | Guiney et al. |
| 8,187,536 B2 | 5/2012 | Graupner et al. |
| 8,199,358 B2 | 6/2012 | Eichhorn et al. |
| 8,203,575 B2 | 6/2012 | Molnar et al. |
| 8,283,176 B2 | 10/2012 | Bland et al. |
| 8,304,704 B2 | 11/2012 | Hing et al. |
| 8,305,434 B2 | 11/2012 | Nakatsuka et al. |
| 8,306,298 B2 | 11/2012 | Bacus et al. |
| 8,306,300 B2 | 11/2012 | Bacus et al. |
| 8,339,703 B2 | 12/2012 | Knebel |
| 8,350,904 B2 | 1/2013 | Fujimoto et al. |
| 8,366,857 B2 | 2/2013 | Hayworth et al. |
| 8,385,619 B2 | 2/2013 | Soenksen |
| 8,385,686 B2 | 2/2013 | Sano |
| 8,388,891 B2 | 3/2013 | Lefebvre |
| 8,394,635 B2 | 3/2013 | Key et al. |
| 8,396,669 B2 | 3/2013 | Cocks |
| 8,463,741 B2 | 6/2013 | Ehlke et al. |
| 8,473,035 B2 | 6/2013 | Frangioni |
| 8,476,585 B2 | 7/2013 | Galloway |
| 8,501,435 B2 | 8/2013 | Gustafsson et al. |
| 8,565,480 B2 | 10/2013 | Eichhorn et al. |
| 8,565,503 B2 | 10/2013 | Eichhorn et al. |
| 8,582,489 B2 | 11/2013 | Eichhorn et al. |
| 8,582,849 B2 | 11/2013 | Eichhorn et al. |
| 8,673,642 B2 | 3/2014 | Key et al. |
| 8,687,858 B2 | 4/2014 | Walter et al. |
| 8,725,237 B2 | 5/2014 | Bryant-Greenwood et al. |
| 8,730,315 B2 | 5/2014 | Yoneyama |
| 8,744,213 B2 | 6/2014 | Tatke et al. |
| 8,747,746 B2 | 6/2014 | Lefebvre |
| 8,771,978 B2 | 7/2014 | Ragan |
| 8,788,217 B2 | 7/2014 | Feingold et al. |
| 8,796,038 B2 * | 8/2014 | Williamson, IV ....... G01N 1/06 422/500 |
| 8,827,760 B2 | 9/2014 | Ushibo et al. |
| 8,923,597 B2 | 12/2014 | Eichhorn et al. |
| 9,310,598 B2 | 4/2016 | Hing et al. |
| 2001/0035752 A1 | 11/2001 | Kormos et al. |
| 2002/0169512 A1 | 11/2002 | Stewart |
| 2002/0176160 A1 | 11/2002 | Suzuki et al. |
| 2002/0176161 A1 | 11/2002 | Yoneyama et al. |
| 2003/0048931 A1 * | 3/2003 | Johnson ............. G06K 9/0014 382/128 |
| 2003/0098921 A1 | 5/2003 | Endo |
| 2003/0112330 A1 | 6/2003 | Yuri et al. |
| 2003/0112504 A1 | 6/2003 | Czarnetzki et al. |
| 2003/0133009 A1 | 7/2003 | Brown |
| 2003/0156276 A1 | 8/2003 | Bowes |
| 2004/0021936 A1 | 2/2004 | Czarnetzki et al. |
| 2004/0027462 A1 | 2/2004 | Hing |
| 2004/0080758 A1 * | 4/2004 | Ban ................ G01B 11/25 356/603 |
| 2004/0090667 A1 | 5/2004 | Gartner et al. |
| 2004/0113043 A1 | 6/2004 | Ishikawa et al. |
| 2004/0129858 A1 | 7/2004 | Czarnetzki et al. |
| 2004/0135061 A1 | 7/2004 | Kreh |
| 2004/0141660 A1 | 7/2004 | Barth et al. |
| 2005/0057812 A1 | 3/2005 | Raber |
| 2005/0073649 A1 | 4/2005 | Spector |
| 2005/0090017 A1 | 4/2005 | Morales |
| 2005/0094262 A1 | 5/2005 | Spediacci et al. |
| 2005/0112537 A1 | 5/2005 | Wu |
| 2005/0211874 A1 | 9/2005 | Takeyama et al. |
| 2005/0219688 A1 | 10/2005 | Kawano et al. |
| 2005/0221351 A1 | 10/2005 | Jekwam |
| 2005/0239113 A1 | 10/2005 | Ryu et al. |
| 2005/0248837 A1 | 11/2005 | Sase |
| 2005/0258335 A1 | 11/2005 | Oshiro et al. |
| 2006/0039583 A1 | 2/2006 | Bickert et al. |
| 2006/0045388 A1 * | 3/2006 | Zeineh ............. G02B 21/365 382/312 |
| 2006/0077536 A1 | 4/2006 | Bromage et al. |
| 2006/0088940 A1 | 4/2006 | Feingold et al. |
| 2006/0098861 A1 | 5/2006 | See et al. |
| 2006/0146283 A1 | 7/2006 | Baumann et al. |
| 2006/0164623 A1 | 7/2006 | Wagner et al. |
| 2006/0171560 A1 | 8/2006 | Manus |
| 2006/0179992 A1 | 8/2006 | Kermani |
| 2007/0025606 A1 | 2/2007 | Gholap et al. |
| 2007/0091324 A1 | 4/2007 | Paul et al. |
| 2007/0098237 A1 | 5/2007 | Yoo et al. |
| 2007/0102620 A1 | 5/2007 | Bublitz et al. |
| 2007/0164194 A1 | 7/2007 | Kurata et al. |
| 2007/0198001 A1 | 8/2007 | Bauch et al. |
| 2007/0207061 A1 | 9/2007 | Yang et al. |
| 2007/0224699 A1 | 9/2007 | Gates |
| 2007/0285768 A1 | 12/2007 | Kawanabe et al. |
| 2008/0002252 A1 | 1/2008 | Weiss et al. |
| 2008/0020128 A1 | 1/2008 | van Ryper et al. |
| 2008/0054156 A1 | 3/2008 | Fomitchov |
| 2008/0095424 A1 * | 4/2008 | Iki ............. G02B 21/367 382/133 |
| 2008/0095467 A1 * | 4/2008 | Olszak ............ G02B 21/367 382/284 |
| 2008/0142708 A1 | 6/2008 | Workman et al. |
| 2008/0180794 A1 | 7/2008 | Tafas et al. |
| 2008/0240613 A1 | 10/2008 | Dietz et al. |
| 2008/0283722 A1 | 11/2008 | Uchiyama et al. |
| 2009/0040322 A1 | 2/2009 | Leberl et al. |
| 2009/0046298 A1 | 2/2009 | Betzig |
| 2009/0116101 A1 | 5/2009 | Tafas et al. |
| 2009/0140169 A1 | 6/2009 | Niehren |
| 2009/0195688 A1 | 8/2009 | Henderson |
| 2010/0000383 A1 | 1/2010 | Koos et al. |
| 2010/0020157 A1 | 1/2010 | Jelinek et al. |
| 2010/0039507 A1 | 2/2010 | Imade |
| 2010/0074489 A1 | 3/2010 | Bacus et al. |
| 2010/0093022 A1 | 4/2010 | Hayworth et al. |
| 2010/0102571 A1 | 4/2010 | Yang |
| 2010/0109725 A1 | 5/2010 | Yun et al. |
| 2010/0118133 A1 | 5/2010 | Walter et al. |
| 2010/0118393 A1 | 5/2010 | Lin |
| 2010/0134655 A1 | 6/2010 | Kuroiwa |
| 2010/0141751 A1 | 6/2010 | Uchida |

(56) References Cited

U.S. PATENT DOCUMENTS

| | | |
|---|---|---|
| 2010/0141752 A1 | 6/2010 | Yamada |
| 2010/0141753 A1 | 6/2010 | Olson et al. |
| 2010/0171809 A1 | 7/2010 | Fujiyoshi |
| 2010/0177166 A1 | 7/2010 | Eichhorn et al. |
| 2010/0188738 A1 | 7/2010 | Epple et al. |
| 2010/0194873 A1 | 8/2010 | Viereck et al. |
| 2010/0201800 A1 | 8/2010 | Yamamoto et al. |
| 2010/0225668 A1 | 9/2010 | Tatke et al. |
| 2010/0260407 A1 | 10/2010 | Eichhorn et al. |
| 2010/0279342 A1 | 11/2010 | Kijima et al. |
| 2010/0295932 A1 | 11/2010 | Yokomachi et al. |
| 2010/0310139 A1 | 12/2010 | Kimura |
| 2011/0017902 A1 | 1/2011 | Hing et al. |
| 2011/0037847 A1 | 2/2011 | Soenksen |
| 2011/0038523 A1 | 2/2011 | Boardman |
| 2011/0043663 A1 | 2/2011 | Tsuchiya |
| 2011/0064296 A1* | 3/2011 | Dixon ............ G01N 21/6428 382/133 |
| 2011/0074817 A1 | 3/2011 | Shinichi et al. |
| 2011/0102571 A1 | 5/2011 | Yoneyama |
| 2011/0109735 A1 | 5/2011 | Otsuka |
| 2011/0145755 A1 | 6/2011 | Bacus et al. |
| 2011/0181622 A1 | 7/2011 | Bacus et al. |
| 2011/0221881 A1 | 9/2011 | Shirota et al. |
| 2011/0316993 A1 | 12/2011 | Chen et al. |
| 2011/0316999 A1 | 12/2011 | Yoneyama et al. |
| 2012/0002043 A1 | 1/2012 | Nitta |
| 2012/0002892 A1 | 1/2012 | Eichhorn et al. |
| 2012/0038979 A1 | 2/2012 | Hing et al. |
| 2012/0044342 A1 | 2/2012 | Hing et al. |
| 2012/0069171 A1 | 3/2012 | Kodaira et al. |
| 2012/0069344 A1 | 3/2012 | Liu |
| 2012/0076391 A1 | 3/2012 | Dietz et al. |
| 2012/0076411 A1 | 3/2012 | Dietz et al. |
| 2012/0076436 A1 | 3/2012 | Dietz et al. |
| 2012/0081536 A1 | 4/2012 | Kuppig et al. |
| 2012/0114204 A1 | 5/2012 | Olson et al. |
| 2012/0120225 A1 | 5/2012 | Maddison |
| 2012/0127297 A1 | 5/2012 | Baxi et al. |
| 2012/0163680 A1 | 6/2012 | Lefebvre |
| 2012/0208184 A1 | 8/2012 | Ragan |
| 2012/0281931 A1 | 11/2012 | Eichhorn et al. |
| 2013/0003172 A1 | 1/2013 | Widzgowski et al. |
| 2013/0076886 A1 | 3/2013 | Ikeno et al. |
| 2013/0140459 A1 | 6/2013 | Galloway |
| 2013/0162802 A1 | 6/2013 | Soenksen |
| 2013/0164781 A1 | 6/2013 | Lefebvre |
| 2013/0182922 A1 | 7/2013 | Kil |
| 2013/0216451 A1 | 8/2013 | Hayworth et al. |
| 2013/0250090 A1 | 9/2013 | Morimoto |
| 2014/0030757 A1 | 1/2014 | Schiffenbauer |
| 2014/0049632 A1 | 2/2014 | Hemmer |
| 2014/0051158 A1 | 2/2014 | Nakajima et al. |
| 2014/0085453 A1 | 3/2014 | Yamane |
| 2014/0086463 A1 | 3/2014 | Meetz et al. |
| 2014/0087411 A1 | 3/2014 | Chow et al. |
| 2014/0098376 A1 | 4/2014 | Hashimshony et al. |
| 2014/0112560 A1 | 4/2014 | Soenksen |
| 2014/0118528 A1 | 5/2014 | Wolff et al. |
| 2014/0130613 A1 | 5/2014 | Adiga et al. |
| 2014/0137715 A1 | 5/2014 | Sneyders et al. |
| 2014/0273086 A1 | 9/2014 | Lefebvre |
| 2015/0015578 A1 | 1/2015 | Eichhorn et al. |
| 2015/0153552 A1 | 6/2015 | Loney et al. |
| 2015/0153555 A1 | 6/2015 | Loney et al. |
| 2015/0153556 A1 | 6/2015 | Loney et al. |
| 2015/0177504 A1 | 6/2015 | Bickert et al. |

FOREIGN PATENT DOCUMENTS

| | | |
|---|---|---|
| CN | 102782557 | 11/2012 |
| CN | 102841079 | 12/2012 |
| DE | 102009012293 | 3/2009 |
| EP | 1447699 | 8/2004 |
| EP | 2051051 | 4/2009 |
| EP | 2110696 | 10/2009 |
| EP | 2169379 | 3/2010 |
| FR | 2620537 | 3/1989 |
| GB | 03092 | 11/1906 |
| JP | 59071018 | 4/1984 |
| JP | 61248168 | 11/1986 |
| JP | S63206793 | 8/1988 |
| JP | 09080138 | 3/1997 |
| JP | 09133856 | 5/1997 |
| JP | 9161068 | 6/1997 |
| JP | 09218354 | 8/1997 |
| JP | 2001281553 | 10/2001 |
| JP | 2002031513 | 1/2002 |
| JP | 200284554 | 3/2002 |
| JP | 2006003543 | 1/2006 |
| JP | 2006343595 | 12/2006 |
| JP | 2009192824 | 2/2008 |
| JP | 2008262100 | 10/2008 |
| JP | 2009-036969 A | 2/2009 |
| TW | 201201392 | 1/2012 |
| WO | WO-0154052 | 7/2001 |
| WO | WO-2005015120 | 2/2005 |
| WO | WO-2008118886 | 10/2008 |
| WO | WO-2008141009 | 11/2008 |
| WO | WO-2010105015 | 9/2010 |
| WO | WO-2012024627 | 2/2012 |

OTHER PUBLICATIONS

Sakura Finetek U.S.A., Inc., "Non final office action", U.S. Appl. No. 14/138,740, (dated Jul. 1, 2016).

Forrest, K., et al., "Tunneling calculations for GaAs—AlxGa(1-x)As graded band-gap sawtooth superlattices", IEEE Journal of Quantum Electronics, vol. 26, No. 6, (Jun. 1990), 1067-1074.

Sakura Finetek U.S.A., "Non-Final Office Action", U.S. Appl. No. 13/212,955.

Haruhisa, S., et al., "Application of telepathology for improvement of therapeutic effects and economic efficiency, and development of new equipment for it", Science Links Japan; http://sciencelinks.jp/j-east/article/200516/000020051605A0431066.php, Journal Code: N20051113, (2005), 166-125.

Sakura Finetek, PCT Search Report and Written Opinion dated Oct. 13, 2011 for Int'l Application No. PCT/US2011/048488., 13 pages.

Sakura Finetek, EPO Office Action dated Jul. 30, 2013 for EPO App No. 10719379.9.

Sakura Finetek, Australian Office Action dated Nov. 26, 2013 for Australian App No. 2010222633.

Sakura Finetek, Japanese Office Action dated Dec. 10, 2013 for JP App No. P2011-553548.

Sakura Finetek U.S.A., Inc., Australian Examination Report dated Dec. 24, 2013 for AU 2011291517.

Sakura Finetek U.S.A., Inc., Chinese second office action dated Dec. 27, 2013 for CN201080017649.4.

Sakura Finetek U.S.A., Inc., Final office action dated Sep. 2, 2014 for Japanese App No. 2011-553548.

Sakura Finetek U.S.A., Inc., Examination Report dated Jun. 19, 2014 for Australian App No. 2011291517.

Sakura Finetek U.S.A., Inc., PCT Search Report and Written Opinion dated Sep. 22, 2014 for International Application No. PCT/US2014/034477, 12 pages.

Sakura Finetek U.S.A., Inc., Chinese Final Office Action dated Jul. 3, 2014 for CN Application No. 201080017649.4.

Sakura Finetek U.S.A., Inc., Non-Final Office Action dated Oct. 31, 2014 for U.S. Appl. No. 13/212,955.

Sakura Finetek U.S.A., Inc., European second office action dated Nov. 6, 2014 for EP Appln. No. 10719379.9.

Sakura Finetek U.S.A., Inc., et al., Chinese Office Action dated Nov. 15, 2014 for CN 201180047558.X.

Sakura Finetek U.S.A., Inc., et al., Australian Examination Report dated Feb. 2, 2015 for App No. 2011291517.

Sakura Finetek U.S.A., Inc., et al., European Office Action dated Jan. 30, 2015 for EP App. No. 11749675.2.

(56) References Cited

OTHER PUBLICATIONS

Sakura Finetek U.S.A., Inc., Final office action dated Apr. 15, 2015 for U.S. Appl. No. 13/212,955.
Sakura Finetek U.S.A., Inc., Non final office action dated Apr. 8, 2015 for U.S. Appl. No. 13/255,827.
Sakura Finetek U.S.A., Inc., Partial European search report for Application No. 14198636.4, (dated Apr. 28, 2015).
Sakura Finetek U.S.A., Inc., et al., Canadian Examiners Report dated Dec. 7, 2012 for CA 2,755,164.
Sakura Finetek U.S.A., Inc., et al., International Preliminary Report on Patentability dated Mar. 7, 2013 for PCT/US2011/048488.
Sakura Finetek USA, Extended Search Report for EP15154503 dated Jun. 19, 2015.
Sensovation AG, PCT International Preliminary Report on Patentability dated Sep. 20, 2011 for Int'l Application No. PCT/IB2010/000518., 7 pages.
Sakura Finetek U.S.A., Inc., International search report and written opinion for PCT/US2014/034477, (dated Sep. 22, 2014).
Sakura Finetek U.S.A., Inc., International Preliminary Report on Patentability for PCT/US2014/034477, (dated Oct. 29, 2015).
Sakura Finetek U.S.A., Inc., Final office action, U.S. Appl. No. 13/255,827, (dated Oct. 20, 2015).
Sakura Finetek U.S.A., Inc., "Supplementary Search Report", EP Application No. 14784707.3, (dated Oct. 4, 2016).
Sakura Finetek U.S.A., Inc., "Office Action", JP Application No. 2016-507909, (dated Sep. 15, 2016).
Sakura Finetek U.S.A., "Extended Search Report", EP Application No. 14198636, (dated Sep. 30, 2015).
Sakura Finetek U.S.A., Inc., "Examination Report", CA Application No. 2908058, (dated Nov. 16, 2016).
Sakura Finetek U.S.A., Inc., "Extended European Search Report", EP Application No. 15194968.2, (dated Mar. 18, 2016).
Sakura Finetek U.S.A., Inc., "Final Rejection", JP Application No. P2013-525005, (dated Dec. 27, 2016).
Sakura Finetek U.S.A., Inc., "First Office Action with search report", CN Application No. 2014800218372, (dated Nov. 30, 2016).
Sakura Finetek U.S.A., Inc., "Fourth Office Action", CN Application No. 201180047558X, (dated Oct. 24, 2016).
Sakura Finetek U.S.A., Inc., "Notice of rejection", JP Application No. 2013-525005, (dated Feb. 9, 2016).
Sakura Finetek U.S.A., Inc., "Second office action", CN Application No. 201180047558.X, (dated Jul. 6, 2015).
Sakura Finetek U.S.A., Inc., "Third Office Action", CN Application No. 201180047558X, (dated Apr. 1, 2016).
Sakura Finetek U.S.A., Inc., "Examiner's Report", CA Application No. 2808105, dated Jun. 12, 2017.
Sakura Finetek U.S.A., Inc., "Examiner's Report", CA Application No. 2908058, dated Jul. 24, 2017.
Sakura Finetek U.S.A., Inc., "Final Office Action", JP Application No. 2016-507909, dated Apr. 28, 2017.
Sakura Finetek U.S.A., Inc., "Non final office action", U.S. Appl. No. 14/138,740, dated Jun. 20, 2017.
Sakura Finetek U.S.A., Inc., "Non final office action", U.S. Appl. No. 13/212,955, dated Aug. 9, 2017.
Sakura Finetek U.S.A., Inc., "Second Office Action", CN Application No. 2014800218372, dated Aug. 1, 2017.
Sakura Finetek U.S.A., Inc., "Final Office Action", U.S. Appl. No. 14/138,740, (dated Jan. 26, 2017).
Sakura Finetek U.S.A., Inc., "First Office Action", EP Application No. 15194968.2, (dated Mar. 10, 2017).
Sakura Finetek USA Inc., "Office Action", EP Application No. 15154503.5, (dated Feb. 28, 2017).
Requirement for Restriction/Election dated Nov. 3, 2014 for U.S. Appl. No. 13/255,827.
Office Action received for Eurasian Patent Application No. 201001786, dated Jan. 21, 2014.
Notice of Allowance and Fees Due (PTOL-85) dated Dec. 16, 2015 for U.S. Appl. No. 13/255,827.
International Search Report and Written Opinion received for PCT Patent Application No. PCT/IB2010/000518, dated Jul. 16, 2010, 16 pages (8 pages of English Translation and 8 pages of Original Document).

\* cited by examiner

METHOD FOR GENERATING A COMPOSITE IMAGE OF AN OBJECT COMPOSED OF MULTIPLE SUB-IMAGES

CROSS-REFERENCE TO RELATED APPLICATION

The application is a U.S. National Phase Application under 35 U.S.C. § 371 of International Patent Application No. PCT/US2014/034477, filed Apr. 17, 2014, which claims the benefit of the earlier filing date of co-pending German Patent Application No. 102013103971.5, filed Apr. 19, 2013, and incorporated herein by reference.

BACKGROUND

The invention relates to a method for generating a composite image of an object composed of multiple sub-images, wherein multiple adjacent sub-images of the object are captured; and said sub-images are combined together by means of an image processing operation to form a coherent composite image.

When biological samples are analyzed, these samples are exposed to a suitable light and are photographed by means of a camera. By suitably marking with biological markers, the biological samples can be examined by, for example, a fluorescent analysis or with colorimetric techniques. Additional examinations can be performed with simple reflected light or transmitted light techniques. For accurate optical scanning of the sample, microscope optical systems are used in order to identify even small biological structures.

If large samples or so-called micro-arrays with a plurality of objects, probes or biochips are examined, there is the problem that a large area has to be photographed with a high resolution. In order to solve this problem, it is known to scan large areas. In so doing, the area is photographed line by line; and the lines are combined to form a composite image. Such a method is known from the U.S. Pat. No. 7,978,874B1.

Compared with such methods, image detectors offer the advantage of a larger optical variability. However, in order to create a composite image, multiple sub-images that are captured by the image detector have to be merged together to form a composite image. In the case of such an image processing operation, also called stitching, the overlapping regions of the sub-images are examined as to whether they match up. For example, an optical object is found in both of the adjacent sub-images, and the position of the sub-images in relation to each other is determined by means of the position of said optical object in the sub-images, so that the sub-images can be stitched together in the correct position. This technique is known, for example, from U.S. Pat. No. 7,778,485B1.

Such a blending together of sub-images to form a composite image can result in inaccuracies if there is inadequate information in the overlapping region of two sub-images, so the position of the sub-images in relation to each other can be determined only inadequately.

In order to solve this problem, it is known, for example, from the WO98/44446 to move a sample substrate with such a high mechanical precision that the adjacent and non-overlapping sub-images of the object can be stitched together with an accuracy of a few μm without image processing. However, this method requires a motion device with which the sample can be moved under the objective lens with high precision.

The object of the present invention is to provide a simple and reliable method for generating a composite image from multiple adjacent sub-images.

This object is achieved by means of a method of the genre described in the introductory part of the specification, where the stitching of the sub-images together to form a composite image in the image processing operation is performed using an optical pattern that is generated by means of a pattern means. The pattern provides adequate optical information, so that the position of the sub-images in relation to each other can be reliably determined by means of the properties of the pattern, such as its location in the sub-images.

In this case it is advantageous if the sub-images at least partially overlap each other, so that the pattern is imaged in the overlapping region of both sub-images or in the pattern images that overlap each other when the pattern is not directly imaged in the sub-image. However, an overlapping of the sub-images is not absolutely necessary because the optical pattern can also be configured in such a way that immediately adjacent sub-images can be fixed in their position to each other by means of the pattern.

The sub-images depict a part of the object. The composite image depicts a larger part of the object or the whole object and is expediently composed of at least two sub-images, in particular, of at least a one-dimensional chain of K sub-images, where K≥3; and, furthermore, in particular, is composed of a two-dimensional arrangement of N×M sub-images, where N≥2 and M≥2. The sub-images can abut each other or overlap each other. The sub-images are at least one-dimensional images with k pixels, where k≥2, expediently two-dimensional images with a two-dimensional pixel arrangement, expediently an arrangement of n×m pixels, where n≥2 and m≥2. Correspondingly an image detector of an image capturing device for capturing sub-images comprises at least k adjacent detector elements that are arranged, in particular, at least n×m in a two-dimensional grid.

An algorithm in the image processing operation expediently uses the optical pattern to stitch together the sub-images. The image processing method can include one or more of the following steps:

At least two images that at least partially contain the optical pattern are examined for pattern elements of the pattern. Optionally the pattern elements can be recognized as such by means of a pattern recognition device. The pattern elements that are found in the two images are compared with each other for agreement. The agreement can be examined in the form of parameters: size and/or color. If the agreement in one or more parameters exceeds a predefined degree, then the two pattern elements are assigned to each other. Complementary pattern elements are examined for their location in relation to each other. The location can comprise the position and the orientation in the images. The location of the pattern elements can be used to relate the two images in their position to each other. The two images are blended by means of this relationship together to form the composite image. In the composite image two complementary pattern elements are congruently superposed one on top of the other.

The pattern means is arranged expediently outside the object. The pattern means generates an additional pattern for imaging the object. Therefore, the pattern is not a pattern that is inherent in the object. The pattern means is expediently independent of the object. As an alternative, the pattern means may be a component of the object, for example, a pattern means that is mounted on a sample carrier. Even pattern elements, such as particles, in a sample element, for example an adhesive, are possible and advantageous. In general, it is advantageous, if the pattern means is arranged in a region or is imaged as a pattern in a region that is free of the object to be examined or free of a region of the object that is to be examined so the pattern does not disturb the contour of the object.

The optical pattern can consist of one or more pattern elements. The pattern can be a predefined pattern that is generated in such a way that its geometry is defined by the pattern means, for example, dots and/or lines. However, it is also possible to generate the pattern in such a way that it is undefined, so that it is not predetermined. The image processing unit comprises one or more algorithms for the pattern recognition; this algorithm expediently recognizes the pattern as such in the sub-image or in the pattern image.

The optical pattern can be imaged totally or partially in the sub-images, expediently in an overlapping region of two adjacent sub-images. However, it is generally not necessary that the pattern be arranged—if desired, only partially—in the overlapping region. If the pattern or a portion of it is arranged in a sub-image, one property of the pattern can be registered from one edge of the pattern (for example, a brightness profile).

If the optical pattern is imaged totally or partially in the sub-images, then the image processing unit can recognize the optical pattern—or more specifically a pattern element directly from the sub-images—and can stitch the sub-images together in the correct position. However, the imaging of the optical pattern in the sub-images has the drawback that the optical pattern hides the image contents of the sub-images and, as a result, can reduce the image content of the sub-images. In order to eliminate this problem, it is advantageous to image the optical pattern in one or more pattern images that expediently have a defined relative location in relation to the sub-images. It is advantageous if the pattern images are different from the sub-images in such a way that the optical pattern is imaged only in the pattern images, and the sub-images don't have a pattern.

It is advantageous if each sub-image is assigned a pattern image. In this case different sub-images are assigned different pattern images. The image processing unit determines the position of the sub-images in relation to each other by means of the location of one pattern element in two images, i.e. two sub-images or two pattern images. The position of the sub-images in relation to each other can also be determined indirectly by means of the location of the pattern images in relation to each other.

In order to capture the sub-images, the object is moved expediently in relation to an image capturing device, such as a camera or an objective lens. As a result, the image capturing device can scan the object sub-image by sub-image. Advantageously the pattern is moved along with the object. Thus, the pattern moves in the same way relative to the image capturing device as the object itself. At the same time it is advantageous if the pattern, in its movement, is coupled completely to the movement of the object, so that no relative movement between the pattern and the object takes place. Since the movement is only a relative movement, it is also possible to hold the object and the pattern in a state of rest and to move the image capturing device. Advantageously the pattern means is moved along with the object holder and the object. In particular, the pattern means is moved automatically with said object holder. In this case an automatic movement can be generated by means of a rigid connection between the pattern means and the object holder.

One advantageous embodiment of the invention provides that the object holder is a sample stage; and the object is a sample, in particular a biological sample, that is arranged on the sample stage. A biological sample includes a biological material, in particular, cells, micro-organisms, bacteria and/or the like. The sample is expediently a two-dimensional, flat sample, which can exhibit one or more sample elements, for example, microchips, an arrangement of multiple sample vessels and/or the like. Advantageously the sample comprises a sample substance that is placed on or in the sample holder. The sample can be covered by a cover, expediently a cover glass. Advantageously the sample holder and, in particular, also the cover are transparent in the wavelength of the object image. A suitable material for the sample holder is glass.

An additional advantageous embodiment of the invention provides that the method is a microscopy method; and that the sub-images are captured by means of the optical system of a microscope. The optical system of the microscope expediently has a magnification of at least a factor of 5 and, in particular, a magnification of at least a factor of 20.

In order to image the optical pattern on an image detector, there are a number of possibilities that depend on multiple parameters. These parameters are described in detail below and can be combined in any way.

The first parameter is the execution of the pattern as a material pattern or a non-material pattern. Hence, the parameter has two possibilities. The pattern can be a material pattern, for example, an item, such as a glass scale, which is securely connected to the object holder, and/or an item, which is securely connected to the object, for example, a sample. Some examples may include particles in the sample, for example, in an adhesive, or a coating of an element of the object. In contrast, a non-material pattern, for example, a radiation pattern, which can be executed in the form of an imaging, is particularly advantageous. The pattern is thrown by, for example, the pattern means, as a radiation pattern onto a pattern carrier, for example, the object. The term radiation pattern also includes a shadow pattern. A projection of a material pattern onto the pattern carrier is advantageous. Expediently the pattern means is configured in such a way that the optical pattern can be switched off; that is, the optical pattern can be switched on and off.

A second parameter is the wavelength, or more specifically the radiation spectrum, in which the pattern is captured on an image detector. The term wavelength is used below not only for a sharp wavelength, but also for a spectrum of wavelengths. Images of the pattern or a portion of it can be captured in the wavelength of the object image or in a wavelength of the pattern image. Hence, these parameters also have two possibilities: that is, a dual parameter. The wavelength of the object image is a wavelength or rather an optical spectrum, in which the sub-images are captured and in which an object image detector that captures the images is sensitive. The wavelength of the image can be in the visible spectral range, can be a fluorescent wavelength or any other suitable spectral range.

A wavelength of the pattern image is different from the wavelength of the object image. Said wavelength of the pattern image lies outside the wavelength of the object image, or more specifically outside the wavelength spectrum of the object image. Said wavelength of the pattern image is such a wavelength, or rather spectral range, in which the sub-images are not captured, and, thus, to which the object image detector is insensitive or which is filtered out of the optical path of the object image. In the course of capturing sub-images, the wavelength of the pattern is, for example, filtered out of the optical path so that the sub-images are not captured in this wavelength. In an additional possibility the wavelength of the pattern is invisible to the object image detector. Hence, said object image detector is insensitive in this wavelength.

An additional parameter constitutes the excitation wavelength and the emission wavelength of the pattern. Typically the emission wavelength of the pattern is included in the excitation wavelength spectrum of the pattern. The pattern is generated, for example, with blue light, emits with blue light, and is captured in the blue spectral range. However, there is also the possibility of configuring the pattern in such a way that its emission wavelength is not included in the excitation wavelength spectrum, for example, in the case of fluorescence. In this case a highly energetic radiation is incident on a pattern carrier, which emits the pattern with low energetic radiation, in which the pattern is then captured. Hence, this parameter is also a dual parameter, and it therefore has two possibilities.

An additional dual parameter has the two possibilities that the pattern is already incident on a pattern carrier as a pattern, for example, the object, or said pattern is first formed by the pattern carrier; that is, the pattern is inherent in the pattern carrier. In this case the pattern carrier is, for example, uniformly exposed; and said pattern carrier generates the pattern in its emission, for example, in that only one pattern region scatters, reflects or fluoresces.

Another dual parameter consists of whether the pattern is imaged in the sub-image, thus in the imaging of the object, which is used for generating the composite image, or whether the pattern is imaged in a pattern image, which is in addition to the object image. In this case the pattern is not imaged in the sub-image, so that the object information in the sub-image is maintained to the maximum extent.

When pattern images are captured, it is advantageous if the pattern images are arranged in a predefined position in relation to the sub-images. The position of the pattern images in relation to each other can be determined by means of an evaluation of the pattern in the pattern images. The position of the sub-images in relation to each other can be determined by means of the known position of the object images in relation to the pattern images, so that these sub-images can be stitched together to form the composite image.

The pattern image can comprise an imaging of the object. However, it is not used as a sub-image. For example, the object is imaged together with the pattern on an object image detector; and a pattern image is captured. The position of the pattern image, particularly in relation to a predefined reference point, is determined by means of the pattern. The sub-image is captured beforehand or afterwards without the pattern, so that there is the possibility of removing the pattern from the imaging and then capturing the sub-image or first capturing the sub-image and then making the pattern visible in the imaging on the detector. Expediently the object holder is held in the same position, for example, relative to the reference point, in both images.

An additional parameter is the place of a non-material pattern. The pattern becomes visible at a pattern carrier. This pattern carrier can be the object or an item that is different from the object, for example, at the object holder or at a different item.

Furthermore, it is advantageous if the pattern is made visible on a pattern carrier that is transparent to a wavelength of the object image. The pattern carrier can be transilluminated in the object image wavelength in which the sub-images were captured, whereas the pattern can be emitted by the pattern carrier. In this case the pattern carrier is expediently opaque to a wavelength of the pattern image. The pattern carrier can be a glass, for example, a sample carrier and/or a cover glass for covering a sample. An adhesive that glues multiple elements together is also possible. The pattern carrier water is similarly possible and advantageous, for example, as a component of the object, while other components of the object can also be used as the pattern carrier at the same time. Glass can be used as such as the pattern carrier or can comprise a stain that is transparent to the wavelength of the object image and is opaque to the wavelength of the pattern image.

Another advantageous embodiment of the invention provides that the pattern is a laser pattern. A predefined pattern is especially easy to generate with a laser. The laser pattern is made visible in an advantageous way on a pattern carrier that is expediently not the object or a part of it. The laser can radiate, just like the laser pattern, in the wavelength of the object image or in a separate wavelength of the pattern image. Similarly it is possible that the laser pattern is excited by the laser and radiates back in a wavelength that is different from the laser.

Furthermore, it is advantageous if the pattern is an interference pattern. This interference pattern can be generated in a pattern carrier, which can be, for example, a cover glass of a sample, and which is transparent to the wavelength of the object image. In this case the interference pattern can be imaged as such on an object image detector or a pattern image detector.

The pattern can be generated, with the same advantage, as a standing wave, in particular in a sample element, i.e. an element associated with the sample: for example, the sample holder or a part of it, such as a sample cover glass.

The generation of the pattern as a speckle pattern is similarly possible and advantageous. This speckle pattern is also generated advantageously in a sample element.

An additional dual parameter is the chronological sequence of the capturing of the sub-images and the pattern images. The capturing can occur simultaneously or in succession. During image capturing in succession, a sub-image can be generated first, and then beforehand or afterwards the pattern image, assigned to the sub-image, can be generated. The sub-image and the pattern image can be imaged on the same object image detector, or the sub-image is imaged on the object image detector, and the pattern image is imaged on a pattern image detector.

Another dual parameter consists of imaging the pattern on either an object image detector or a pattern image detector, which is separate from the object image detector. In the event that two detectors are used, these detectors can be sensitive in the same wavelength of the object image or in different spectral ranges: for example, the object image detector in the wavelength of the object image and the pattern image detector in the wavelength of the pattern image.

An additional parameter is the choice of the objective lens that captures the pattern. The pattern can be imaged with an object objective lens on a detector, and this object objective lens also images the object on the object image detector. Another possibility consists of imaging the pattern with a pattern objective lens, which is expediently present in addition to the object objective lens, and by means of which the object is not imaged. The parameters of both detectors and the two objective lenses can be combined with each other in any way. Thus, an optical path can be guided from two objective lenses to one detector, or from one objective lens to two detectors, or from two objective lenses to two detectors, or from one objective lens, which images the object and the pattern, to a single detector.

An additional parameter consists of the relative position of the pattern in relation to the object. The pattern can be made visible on or in the object, expediently in the plane of the object image. Another possibility consists of arranging the pattern in the object image, but before or after the plane of the object image. To this end, it is advantageous if the pattern is arranged outside the object plane of the sub-images; i.e. outside the plane on which the optical system focuses on the object image detector for sharp imaging of the object. In this case the optical system can focus initially on the pattern and then on the object or vice versa. The images, i.e. the sub-images and the pattern images, can be captured as a function of the focusing. A third possibility for the parameters consists of arranging the pattern next to the object and outside the object image.

Another parameter can include whether the radiation that generates the optical pattern is incident on the object, or whether the pattern goes through the object. If the radiation is incident on the object, then the radiation can be incident on the object by means of the objective lens of the object. That is, the radiation can be coupled into an image optical path of the object image. As an alternative or in addition, the radiation can be transmitted from externally past the objective lens of the object onto the object. If the pattern radiates in the transmitted light technique, then said pattern is passed through the object or the object holder.

The choice of a suitable pattern means offers an additional parameter. The pattern means can be a transmission element, i.e. such an element that is illuminated by a light source and allows only a portion of the radiation to pass as the light pattern or shadow pattern. Another embodiment uses a self-radiating pattern, for example, an LED, which already forms a pattern by means of its non-uniform emission, so that in one advantageous embodiment of the invention the pattern can be an imaging of a pattern light source.

The aforementioned parameters can be combined in any way so that an advantageous generation of the pattern is achieved for the respective application. Individual advantageous exemplary embodiments are described in conjunction with the figures. However, due to the plethora of possible and advantageous embodiments corresponding to the combination of the aforementioned parameters, it is not possible to describe all of the advantageous embodiments. Correspondingly only a small selection of advantageous embodiments can be presented. However, other combinations of the parameters may be advantageous in other applications.

In addition, the invention relates to a device for generating a composite image composed of multiple sub-images. The device comprises an object image detector, an optical system for imaging an object on the object image detector, and an image processing unit for stitching multiple adjacent and, in particular, partially overlapping sub-images of the object together to form a coherent composite image.

It is proposed that the device exhibits a pattern means for generating an optical pattern according to the invention. In this case the image processing unit is preconfigured to stitch the sub-images together to form the composite image by means of the pattern. As described above, the relative position of the sub-images in relation to each other can be recognized by means of the pattern, and the sub-images can be stitched together in the correct position to form the composite image.

The device comprises advantageously one or more of the above described device elements, such as detectors, objective lenses, sample elements, pattern carriers and the like.

Furthermore, the device advantageously comprises a control unit that is preconfigured to carry out the method according to the invention and one or more of the above described details of the method.

The optical system expediently comprises an object optical system, which is transmissive in a wavelength of the object image, and which can also comprise an object objective lens. Furthermore, the optical system comprises advantageously a pattern optical system, which is transmissive in a wavelength of the pattern image and which can also comprises a pattern objective lens. Expediently, an object optical system is less than 50% transparent in a wavelength of the pattern image, in particular less than 10%.

The above description of advantageous embodiments of the invention includes numerous parameters of the invention that are described in detail. However, the person skilled in the art will combine these features in a practical way to form logical combinations. In particular, these features can be combined individually and in any suitable combination with the inventive method and the inventive device, according to the independent claims.

The above described properties, features and advantages of the invention as well as the manner in which said properties, features and advantages are achieved, will become clearer and will be better understood in conjunction with the following description of the exemplary embodiments that are explained in detail with reference to the drawings. The purpose of the exemplary embodiments is to explain the invention and not to limit the invention to the combination of features that are disclosed in said exemplary embodiments, not even with respect to the functional features. In addition, the respective suitable features of any one of the exemplary embodiment may also be viewed explicitly in isolation, may be removed from one exemplary embodiment, inserted into another exemplary embodiment in order to complement it, and/or can be combined with any one of the claims.

DETAILED DESCRIPTION

Figure 1:
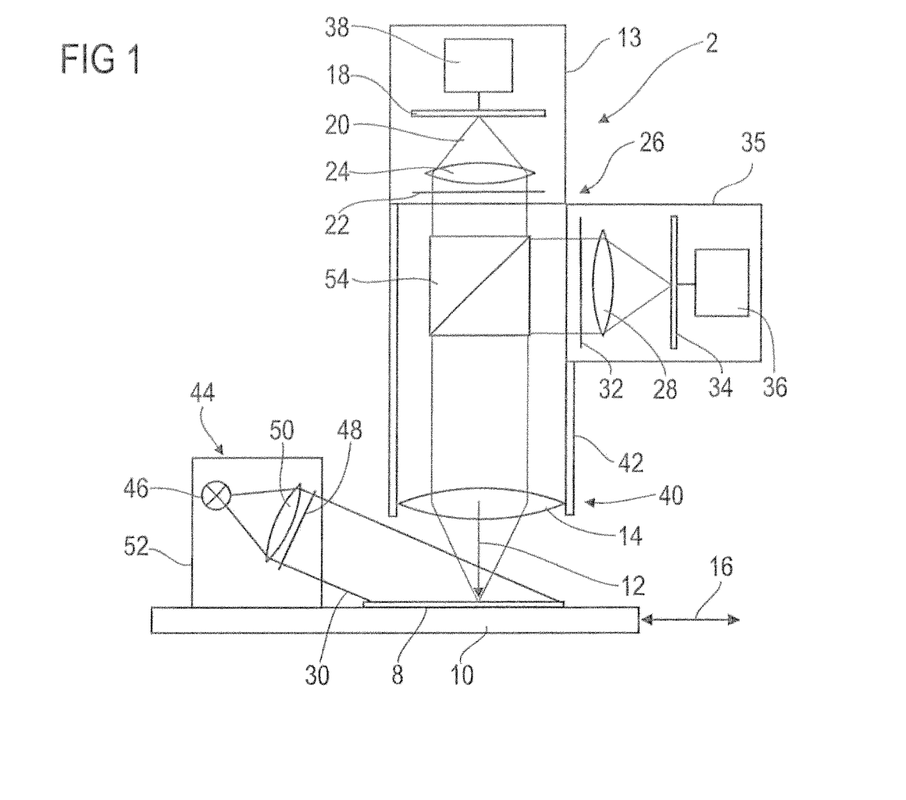
FIG. 1 is a device for capturing images of an object.
Figure 2:
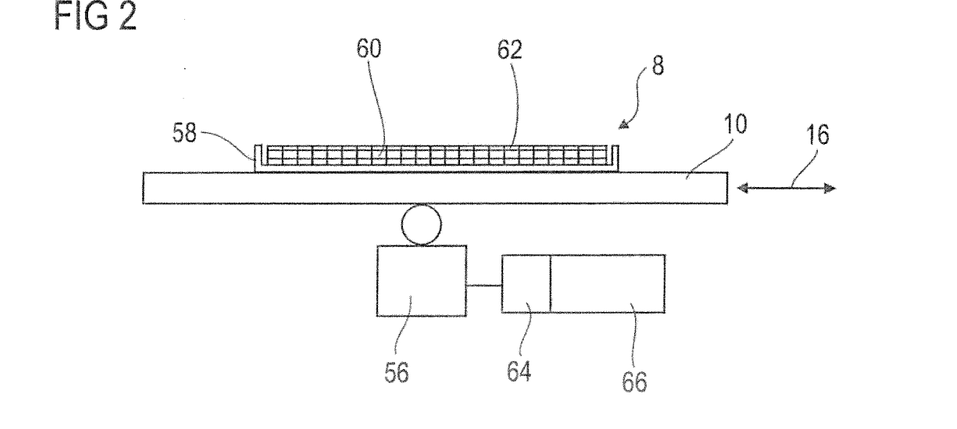
FIG. 2 is a movable object holder of the device from FIG. 1 with an object arranged on said object holder.
Figure 3:
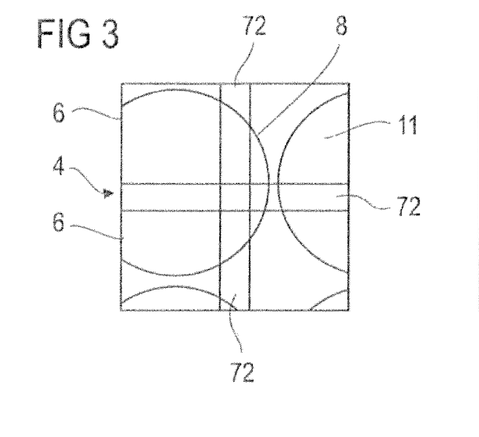
FIG. 3 is a composite image of the object, where said composite image is composed of four sub-images.

FIG. 1 shows a device 2 for generating a composite image 4, which is shown by way of example in FIG. 3. The composite image 4 is composed of multiple sub-images 6 and shows an object 8, which is rigidly attached to an object holder 10 (FIG. 1). In the illustrated exemplary embodiment, the object 8 is a sample, which contains a plurality of biochips 11, which are examined by means of the composite image 4. The object holder 10 is a sample stage, which can be moved, as shown by way of example in FIG. 2, perpendicular to the direction of view 12 of an objective lens 14 of the device 2. This mobility of the object holder is shown by means of the double arrow 16.

In order to capture the object images or more specifically the sub-images 6 of the object 8, as they are called here, the device 2 comprises an image capturing device 13, for example in the form of a camera, which can comprise an object image detector 18 or any other suitable unit for capturing the sub-images 6. A spectral filter 22 is arranged upstream of the object image detector 18 in the optical path 20 of the object image. This spectral filter can have one or more different filter elements, so that the sub-images 6 can be captured in different wavelengths of the object image.

Further upstream in the optical path 20 there is an optical imaging system 24, which is a part of the optical system 26, which comprises not only the optical imaging system 24, but also the objective lens 14. In the exemplary embodiment shown in FIG. 1, the optical system 26 also comprises an optical imaging system 28 for imaging a pattern 30, which is shown by way of example in FIG. 4, by means of an optional filter 32 on a pattern image detector 34, which is also a part of the image capturing device 13 of the device 2.

Furthermore, the device 2 comprises an image capturing device 35 with an image processing unit 36 for processing the pattern 30, imaged on the pattern image detector 34, by means of image processing steps. An additional image processing unit 38 is used for processing the object images or more specifically the sub-images 6 and for evaluating the sub-images 6 or more specifically the composite image 4 with respect to the optical properties of the object 8. The two image processing units 36, 38 can also be configured as a single image processing unit 36, which takes over the functions of the two depicted image processing units 36, 38.

In the exemplary embodiment shown in FIG. 1, the objective lens 14 is a part of a microscope 40 with an image magnification of at least a factor of 5 and, in particular, an image magnification of at least a factor of 20. The microscope 40 comprises a microscope tube 42 (which is shown only in schematic form) for eliminating the scattered or stray light. As an alternative, the objective lens 14 is a part of an optical unit without image magnification, for example, for stitching together overview images. It is especially advantageous if the objective lens can be adjusted in such a way that it images on the object image detector 18 with or without magnification.

Furthermore, the device 2 comprises a pattern means 44 having a light source 46, a pattern element 48 and a pattern optical system 50. The pattern element 48 is, for example, a pattern shutter, in which the pattern 30 is arranged, as transparent apertures, in a shutter that is otherwise opaque for the light of the light source 46. As an alternative, the light source and the pattern element 48 are a single element, which emits light in a pattern. As an example, it is possible to use an LED having spatial emission characteristics that are not homogeneous. A corresponding pattern is imaged on the pattern carrier by means of the pattern optical system 50.

The term "light" is not limited in the following to the visible spectrum, but rather can also include electromagnetic radiation of any suitable wavelength or more specifically of any suitable spectrum. The pattern means 44 is securely connected to the object holder 10 by way of a pattern means holder 52 so that the pattern means is always in the same position in relation to the object 8.

FIG. 2 shows the object holder 10 and, arranged on it, the object 8 in a detailed drawing. The object holder 10 comprises a motion unit 56 for moving the object holder 10 with a motor in relation to the objective lens 14. The movement occurs perpendicular to the direction of view 12. As a result, it is also possible for the motion to occur in the direction of view 12, in order to make it easier to focus the objective lens 14 on different planes of the object 8. As an alternative, the objective lens 14 is preconfigured to focus on different planes, which are arranged at various distances from the objective lens 14 in the direction of view 12.

The object 8 from FIG. 2 comprises a container 58 with multiple object elements arranged in said container. Each of these object elements includes a glass slide and, arranged on it, a sample 60, which is covered on the top with a cover glass 62. The sample 60 to be observed is typically kept in a surrounding medium, for example in water or glycerin, or is a formalin-fixed and paraffin-embedded sample. The sample 60 can be a tissue section, for example, a cell population. In this case the cells can be stained and/or marked for visualization and differentiation. One example of such a stain is hematoxylin and eosin in histology. Additional examples include staining techniques in immunohistochemistry and selective marking by means of fluorescent dyes.

A sample 60 to be observed occupies only a portion of the area of the object 8, not only because in the example there are multiple object elements, each with one sample 60. The samples occupy only a sub-region of the object elements, so that there is an interesting region to be observed, and there are other regions that can be used, as required, for patterns without covering the sample 60.

The object 8 lies on the object holder 10 and is securely connected to said object holder, so that when the object holder 10 moves in relation to the object 14, the object 8 moves along exactly the sample 8 of this relative movement [sic]. The motion unit 56 is controlled by a movement means 64, which may be a part of a central evaluation means 66, which can also comprise the image processing units 36, 38.

A number of advantageous methods for generating a composite image 4 are described below by means of multiple examples.

The object 8 is securely connected to the object holder 10 and is moved into the field of view of the objective lens 14. If desired, there may also be a focusing step, so that the objective lens 14 focuses the object 8 in a focal plane of the object; that is, the object focal plane that is imaged on the object image detector 18 lies in a desired position inside the object 8. The object 8 can be illuminated with reflected light or transmitted light; and a sub-image 6 of the object 8 can be imaged on the object image detector 18 and captured.

Figure 4:
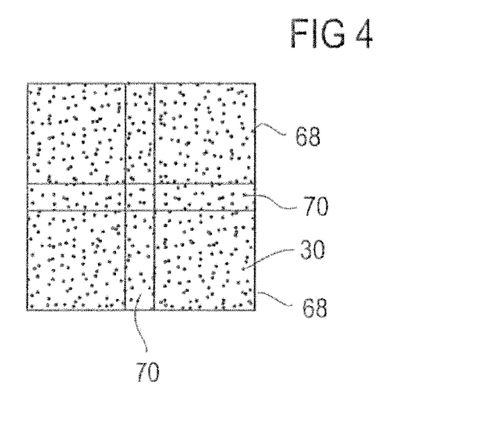
FIG. 4 is four pattern images with an optical pattern.

In addition to the illumination of the object, the object 8 is illuminated by means of the pattern means 44. This approach allows the pattern 30, for example, a dot pattern indicated in FIG. 4, to be put on the object 8 or another pattern carrier, for example, the cover glass 62. FIG. 4 shows four pattern images 68, which overlap each other, so that the edges of each of two pattern images 68 form overlapping regions 70, i.e. the pattern regions that are imaged on both pattern images. The sub-images 6 also overlap each other in their edge regions in an analogous way, so that at these edge regions each of two sub-images 6 also forms an overlapping region 72, which shows an object region that is imaged on both sub-images 6.

Each sub-image 6 is an object image of the object 8 and shows the corresponding section of the object 8. A pattern image 68 shows the pattern 30 on the object 8. Object elements can also be visible in the pattern image 68; however, this is not necessary. The pattern 68 is emitted by a pattern carrier, which can be the object 8 or can be arranged above, below or next to the object 8.

The position of the pattern images 68 is expediently selected in such a way that one pattern image 68 covers a sub-image 6 exactly. Hence, the images 6, 68 are identical in shape and position on the object 8. Correspondingly the overlapping regions 70, 72 are also congruently superposed one on top of the other. In each case one sub-image 6 and one pattern image 68 correspond to each other and are assigned to each other. If the position of two pattern images 68 in relation to each other is known, then the position of the corresponding sub-images 6 in relation to each other is also known.

However, the sub-images 6 and the pattern images 68 are captured in different wavelengths. Hence, the object 8 is illuminated in a wavelength of the object image and emits in this wavelength, so that the sub-images are captured by the object image detector 18 in this wavelength of the object image. In contrast, the pattern carrier is illuminated in a pattern image wavelength, which is different from the object image wavelength, and the pattern 30 is emitted from the pattern carrier in the wavelength of the pattern image. In this exemplary embodiment the illumination wavelength of the light source 46, i.e. the excitation wavelength of the pattern 30, is also its emission wavelength, i.e. the pattern image wavelength, in which the pattern images 68 are captured.

The wavelength of the pattern image is selected in such a way that the pattern image 68 does not reach the object image detector 18 and/or said object image detector is insensitive to the wavelength of the pattern image. In the exemplary embodiment shown in FIG. 1, the decoupling element 54 separates the wavelength of the pattern image from the wavelength of the object image, so that the pattern image 68 is captured by the pattern image detector 34 in the wavelength of the pattern image, and the object image is captured by the object image detector 18 in the wavelength of the object image. In this way it is possible to avoid the object image suffering a loss of information due to the overlapping with the pattern image. In the course of quickly creating the composite image 4, the pattern 30 and the object 8 can be imaged simultaneously on the pattern image detector 34 or on the object image detector 18 respectively and can also be captured, in particular, at the same time.

After capturing a sub-image 6 and—before, after, or at the same time—capturing a pattern image 68, the object 8 is moved in relation to the objective lens 14 by means of the motion unit 56, so that an additional section of the object 8 comes to rest in the field of view of the objective lens 14. At this point another sub-image 6 with the associated pattern image 68 is captured, so that now there are two sub-images 6, each with its associated pattern image 68.

The evaluation means 66 calculates by means of image processing methods the relative position of both pattern images 68 in relation to each other from the pattern elements imaged in the two pattern images 68. For this purpose the evaluation means compares the pattern 30 in the overlapping region 70 of the two pattern images 68 for identical pattern elements. If the pattern image 68 reveals a region that is identical to a region in another pattern image 68, then the two regions can be brought to congruence, and in doing so the two pattern images 68 can be positioned relative to each other. Since at this point the position of the pattern images 68 in relation to each other is known, the sub-images 6 can also be positioned in relation to each other. The sub-images 6 are in a pre-known position and orientation to the pattern images 68, so that when the position of the pattern images 68 in relation to each other is known, the sub-images 6 can also be properly stitched together. At this point the sub-images 6 can be combined to form the composite image 4. In so doing, all of the sub-images 6 with the associated pattern images 68 of the composite image 4 can be captured in a first step, and then the composite image 4 is only created after all of the images have been captured. It is also possible to merge the sub-images 6 one after the other by means of the pattern images 68 and, as a result, to create the composite image 4 in succession.

The wavelength of the pattern image is chosen, corresponding to the object 8, in a suitable spectral range. The spectral range should be one in which the pattern 30 becomes visible on the object 8 or on a suitable pattern carrier that is arranged on said object. In the exemplary embodiment depicted herein, the object 8 comprises a cover glass 62, which is opaque to ultraviolet light. In this case opaque is understood to mean a degree of transparency of less than 50%, in particular, less than 10%. To show the pattern 30, the object 8 or the object holder 10 has a pattern carrier, on which the pattern 30 becomes visible. The wavelength of the pattern is selected in such a way that the incident pattern 30 can become visible on the pattern carrier.

In the exemplary embodiment depicted in FIG. 2, the pattern carrier is the cover glass 62, and the wavelength of the pattern is an ultraviolet spectral range. The pattern 30 is imaged on the cover glass 62, so that the image processing unit 36 can recognize the pattern 30. Correspondingly the optical system 26 of the device 2 has to be configured in such a way that the pattern 30 can be captured. In this respect the objective lens 14 and the optical imaging system 28 are transparent to the wavelength of the pattern and are beam forming. The optical imaging system 24 can be non-transparent to the wavelength of the pattern and/or the object image detector 18 can be insensitive to the wavelength of the pattern. If the optical imaging system 24 is transparent to the wavelength of the pattern, and the object image detector 18 is sensitive to the wavelength of the pattern, then the decoupling element 54 and/or the filter 22 should be selected in such a way that the pattern image 68 does not appear in the sub-image 6.

The cover glass 62 can have a stain that is invisible in the sub-images 6.

In an alternative embodiment of the invention, the pattern 30 can be generated initially by the pattern carrier. Then the pattern 30 is intrinsic in the pattern carrier. In the specific case this can be carried out in such a way that the pattern carrier—for example, the cover glass 62—is uniformly illuminated with light in the wavelength of the pattern. At this point the pattern element 48 is no longer present in the pattern illumination, but rather in a different form in the pattern carrier, for example, as an embossed structure. As a result, the pattern carrier can exhibit a stain that is invisible in the sub-images 6. As an alternative, the pattern carrier has, for example, a fluorescent pattern that fluoresces in the form of the pattern when a large area is illuminated. In this case the corresponding fluorescent wavelength, i.e. the emission wavelength of the pattern 30, is a wavelength other than the incident wavelength for exciting the fluorescence. However, it is also possible to conceive of other pattern elements in which the incident wavelength is identical to the emission wavelength—for example, by means of a reflection pattern or by means of different transparencies of the pattern carrier—so that some portions of the pattern carrier are transparent and others are opaque to the wavelength of the pattern.

If the goal is to economize by eliminating the additional detector 34, then the wavelength of the pattern has to be selected in such a way that the pattern 30 can be recognized by the object image detector 18. Then it is also possible to dispense with the decoupling element 54. The illumination of the pattern means 44 can be switched on and the pattern image can be captured by the object image detector 18. Then the illumination, which generates the pattern 30, can be switched off, and the object 8 is captured in the form of a sub-image 6. Between the capturing of the pattern image and the sub-image 6, the object 8 is held rigidly in a state of rest in relation to the objective lens 14. The object 8 is moved relative to the objective lens 14 only after the pattern image and the sub-image 6 have been captured.

Similarly it is possible that the pattern carrier, for example, the cover glass 62, has a stain, which is visible to the object image detector 18 only during illumination with the light source 46. When the light source 46 is switched on, the pattern image 68 is captured, and when switching off the light source 46, in which the stain does not appear in the sub-image 6, the sub-image 6 is captured. The pattern can be generated with a pattern element 48 or the pattern is intrinsic in the pattern carrier, for example, through a suitable distribution of the stain in the pattern carrier.

Rather than switching the pattern illumination on and off, the spectral filter 22 can be selected in such a way that the pattern 30 is visible or is not visible in the object image detector 18, according to the position of the spectral filter 22. For example, in order to capture the pattern image, the spectral filter 22 can be different from the filter that is used for capturing the sub-image 6. Or the spectral filter 22 is used only for capturing the sub-image 6, so that the pattern 30 is filtered out by the spectral filter 22.

The arrangement of the pattern 30 in relation to the object 8 can also be selected in a different way. In the exemplary embodiment from FIG. 2 the pattern carrier 62 is arranged above the sample 60. In the event that the pattern image and the sub-image 6 are to be captured with a detector 18, then the first step is to focus on the pattern 30, or more specifically on the pattern carrier 62, and then on the object 8, or more specifically on the sample 60. However, it is also possible to position the pattern carrier below the sample 60 or at the object holder 10. Even an arrangement next to the object 8, in particular at the object holder 10, is conceivable and advantageous.

Figure 5:
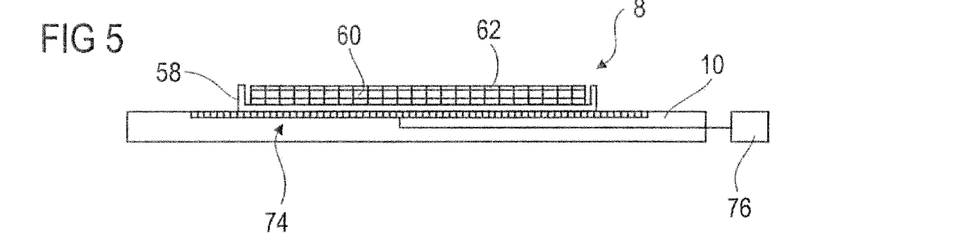
FIG. 5 is an object holder, which is modified compared to the object holder from FIG. 2, in schematic form.

An additional possibility for generating a pattern is shown in FIG. 5. FIG. 5 shows the object holder 10, in which a pattern means 74 is embedded. The pattern means 74 generates a pattern, which can be switched on and off, at the object holder 10. In FIG. 5 the pattern means 74 is an LCD unit, with which the pattern can be generated in the form of individual pixels. The pattern means 74 comprises a control unit 76 for generating the pattern and, in particular, for switching on and off the pattern. As an alternative to the individually controllable pixels, the pattern can be a permanently pre-installed pattern, which allows a particularly fine configuration of the pattern. However, a variable pattern is also possible, for example, in the form of a screen, which can generate the pattern variably as a function of the control commands of the control unit 70.

The pattern is switched on by switching the individual regions of the pattern means 68 to opaque mode, transparent mode or self-illuminating mode. Therefore, the object holder 10 is, for example, transparent to the wavelength of the object image. For this wavelength of the object image the individual regions of the pattern means 68 can be switched to opaque mode so that the pattern becomes visible during transmitted light illumination. The pattern is switched off by switching the regions of the wavelength of the object image to transparent mode, so that the pattern is invisible for the object image detector 18. In this way the pattern image and the sub-image 6 can be captured one after the other, so that the image data loss in the object image or more specifically the sub-image 6 can be minimized. It is possible to dispense with the image capturing device 35. The pattern means 74 is simultaneously the pattern carrier. The pattern means 74 is expediently mounted securely on or in the object holder 10 and is always moved along with this object holder.

The pattern can also be transmitted as a transmitted light pattern from below into the object 8. For example, the pattern means 44 from FIG. 1 is arranged, as a transmitted light pattern means, beneath the object holder 10.

Figure 6:
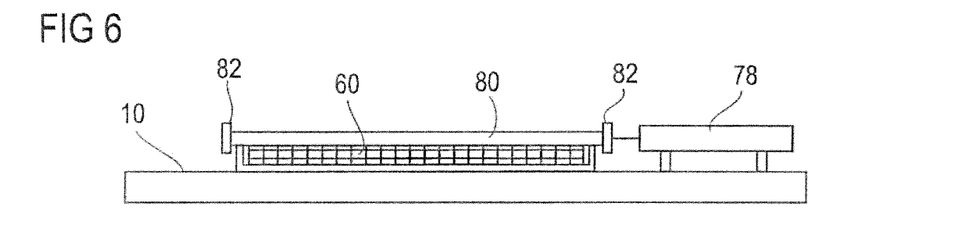
FIG. 6 is a pattern means for generating a pattern with a laser.

Another possibility for generating a pattern is shown in FIG. 6. A laser 78 couples a pattern in a pattern carrier 80, for example, a special cover glass, which is provided with two reflectors 82. Standing waves, which can be recognized as the brighter regions in the upward direction, are produced in the pattern carrier 80. If the laser 78 is switched off, then the pattern vanishes, and the pattern carrier 80 is transparent to the wavelength of the object image.

As an alternative, it is possible to select an interference pattern, which is formed in or on the pattern carrier 80. Similarly, as an alternative, it is possible to integrate inhomogeneity in the pattern carrier 80. This inhomogeneity has the effect of decoupling the laser light in the direction of the objective lens 14, so that the pattern becomes visible as the decoupling pattern. The inhomogeneities should be selected in such a way that they are as invisible as possible from the top and without laser illumination so that the object image is not disturbed.

Furthermore, it is possible to generate a speckle pattern in a pattern carrier. The pattern carrier can be the cover glass 62, and the speckle pattern is generated with a laser in the cover glass 62. This pattern is easy to generate and is very fine, so that it is possible to determine precisely the position of the pattern images 68 in relation to each other.

Figure 7:
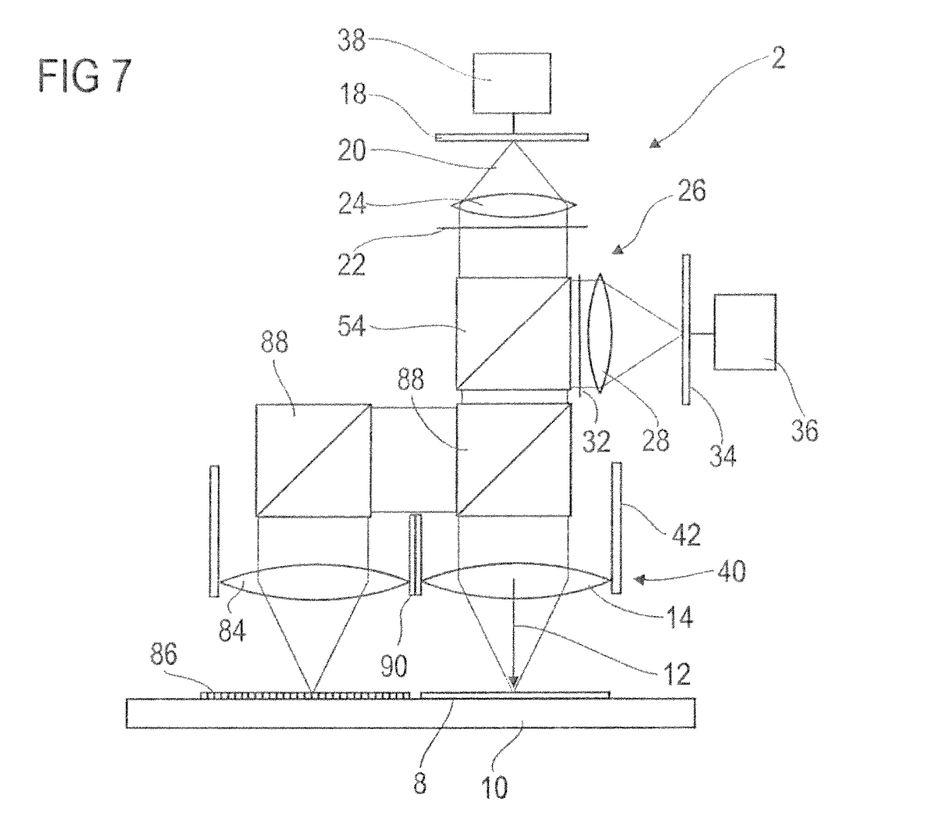
FIG. 7 is an additional device for capturing the image of an object with an additional pattern objective lens.

In the exemplary embodiment shown in FIG. 7, the device 2 comprises not only the objective lens 14 for imaging the object 8, but also an additional objective lens 84 for imaging the pattern, or more specifically a pattern carrier 86 that carries the pattern. In this case the pattern can be configured as a material pattern, which is securely connected to the object holder 10 and, in particular, is embedded in this object holder. The pattern is arranged next to the object 8 and is securely connected to this object. The pattern image, or rather its optical path, can be coupled into the optical path of the object image by means of suitable beam guiding elements 88, and can be captured either by the object image detector 18 or can be decoupled by means of the decoupling element 54 and can be fed to the image capturing unit 35 with the pattern image detector 34.

As an alternative, it is possible to have a totally separate pattern camera in addition to the object camera. In this case both cameras are rigidly coupled to each other. In order to couple the two cameras, one of the two cameras, expediently the object camera, comprises a coupling preparation device 90, with which the other camera can be coupled. If stitching is desired, then the pattern camera can be coupled to the object camera; and the stitching can be performed by means of the pattern images of the pattern camera. If stitching is not necessary, then the pattern camera can be decoupled and removed.

Independently of the type of pattern generation and the pattern 30, the sub-images 6 can be captured one after the other. At this point there is the possibility of not combining the sub-images 6 of a composite image 4 together to form a composite image until after all of the sub-images 6 of the composite image 4 have been captured. This approach has the advantage that a sub-image can be merged with the respective adjacent sub-image 6 not only at one edge, but also at several of its edges, so that merging errors can be eliminated or minimized through position redundancy.

However, it is preferred that the sub-images 6 be merged one after the other, in particular in the sequence in which they were captured. Preferably the merging is performed in real time. Hence, before all of the sub-images 6 of the composite image 4 are captured, in particular, even before the next subsequent sub-image 6 is captured, a sub-image 6 is merged with an adjacent sub-image 6, in particular, with the sub-image that was captured immediately before.

This arrangement makes it possible to achieve the advantage that the regions of the composite image 4 composed of multiple sub-images 6 can be looked at without delay; one does not have to wait until the composite image 4 is created. The merging is performed by means of an imaging processing operation, for example, for each of two sub-images 6 that have been captured directly one after the other. As a result, the composite image 4 is stitched together piece by piece in the sequence, in which the sub-images 6 were captured. In this respect the already merged region of the composite image 4 is outputted on a display unit, for example, a screen.

In the event that a merging error is made while merging two sub-images 6, there is the risk that this error will propagate into the placement of the subsequent sub-images 6. In order to avoid such an error, a sub-image 6 can be stitched at all of its edges, which abut the adjacent sub-images 6 or overlap said adjacent sub-images, together with these adjacent sub-images 6 in a second merging step. Furthermore, in a third merging step it makes sense to merge a sub-image 6 anew between all of the adjacent sub-images 6, when all of the adjacent sub-images 6 are present. With this renewed merging step earlier merging errors can be corrected. Furthermore, in a fourth merging step all of the sub-images 6 of the composite image 4 can be merged once again after all of the sub-images are available, so it is possible with this approach to minimize a merging error of the composite image 4. Naturally not all of the four merging steps have to be executed, but rather it is possible to select one, two or three steps at random, for example, corresponding to the requirements for the composite image 4 or the requirements for the properties of the object.

| List of reference numerals | |
|---|---|
| 2 | device |
| 4 | composite image |
| 6 | sub-image |
| 8 | object |
| 10 | object holder |
| 11 | biochip |
| 12 | direction of view |
| 13 | image capturing device |
| 14 | objective lens |
| 16 | arrow |
| 18 | object image detector |
| 20 | optical path |
| 22 | spectral filter |
| 24 | optical imaging system |
| 26 | optical system |
| 28 | optical imaging system |
| 30 | pattern |
| 32 | filter |
| 34 | pattern image detector |
| 35 | image capturing device |
| 36 | image processing unit |
| 38 | image processing unit |
| 40 | microscope |
| 42 | microscope tube |
| 44 | pattern means |
| 46 | light source |
| 48 | pattern element |
| 50 | pattern optical system |
| 52 | pattern means holder |

| List of reference numerals | |
|---|---|
| 54 | decoupling element |
| 56 | motion unit |
| 58 | container |
| 60 | sample |
| 62 | cover glass |
| 64 | motion means |
| 66 | evaluation means |
| 68 | pattern image |
| 70 | overlapping region |
| 72 | overlapping region |
| 74 | pattern means |
| 76 | control unit |
| 78 | laser |
| 80 | pattern carrier |
| 82 | reflector |
| 84 | objective lens |
| 86 | pattern carrier |
| 88 | beam guiding element |
| 90 | coupling preparation device |

The invention claimed is:

1. A method for generating a composite image of an object composed of multiple sub-images, wherein multiple adjacent sub-images of the object are captured, and the sub-images are combined by means of an image processing operation together to form a coherent composite image, wherein the stitching together of the sub-images to form a composite image in the image processing operation is performed using a predefined optical pattern that is generated with a pattern means, wherein the pattern means is independent of the object, and wherein the multiple sub-images are non-overlapping, and wherein (A) the optical pattern is generated with an incident wavelength and is emitted and captured with an emission wavelength that is different from the incident wavelength, (B) the pattern is captured in pattern images simultaneously with the capturing of the sub-images, and the sub-images are free of the pattern, and (C) the pattern images determine the position of the sub-images in relation to each other by means of the location of the one pattern element in two pattern images.

2. The method according to claim 1, characterized in that the object is a sample, which is arranged on an object holder, which is designed as a sample stage, and the method is a microscopy method, and the optical system is a microscope optical system with a magnification of at least a factor of 5.

3. The method according to claim 1 or 2, characterized in that the pattern means throws the pattern, as a radiation pattern, on a pattern carrier.

4. The method according to claim 1, characterized in that the pattern is generated in an object image wavelength, in which the sub-images of the object are captured.

5. The method according to claim 1, characterized in that the pattern is captured in pattern images and the sub-images are free of the pattern.

6. The method according to claim 1, characterized in that the pattern images, which are in addition to the sub-images, are captured; and that said pattern images are arranged in a predefined position in relation to the sub-images; and that the pattern is visible in the pattern images.

7. The method according to claim 1, characterized in that the pattern is generated with an incident wavelength and is emitted and captured with an emission wavelength that is different from the incident wavelength.

8. The method according to claim 1, characterized in that the pattern is a fluorescent pattern.

9. The method according to claim 1, characterized in that the pattern is made visible on a pattern carrier that is arranged on the object and is transparent to a wavelength of the object image.

10. The method according to claim 1, characterized in that the pattern is a laser pattern.

11. The method according to claim 1, characterized in that the pattern is an interference pattern.

12. The method according to claim 1, characterized in that the pattern is generated as a standing wave, in particular in a sample element.

13. The method according to claim 1, characterized in that the pattern is a speckle pattern.

14. The method according to claim 1, characterized in that the object is imaged on an object image detector and a pattern image is captured together with the object image elements, the pattern is removed from the imaging, and a sub-image of the object is captured.

15. The method according to claim 1, characterized in that the pattern is arranged outside the object plane of the sub-images.

16. The method according to claim 1, characterized in that the pattern is an imaging of a pattern light source.

17. The method according to claim 1, characterized in that the pattern is a transmitting light pattern which is transmitted from below into the sample.

18. The method according to claim 1, characterized in that for the purpose of capturing an image, the sub-images are imaged with an objective lens on an object image detector; and that the pattern is incident on the object at least partially by means of the objective lens.

19. The method according to claim 1, characterized in that the object is imaged with an objective lens on an object image detector and the pattern is imaged with the objective lens simultaneously on a pattern image detector.

20. The method according to claim 19, characterized in that the objective lens focuses the object in a focal plane of the object and focuses the pattern in a pattern focal plane that is different from the focal plane of the object.

21. A device for generating a composite image composed of multiple sub-images, said device comprising an object image detector, an optical system for imaging an object on the object image detector, and an image processing unit for combining multiple adjacent sub-images of the object together to form a coherent composite image, characterized by a pattern means for generating a predefined optical pattern, where the image processing unit is preconfigured to stitch the sub-images together to form the composite image by means of the pattern, wherein the pattern means is independent of the object, and wherein the multiple sub-images are non-overlapping, and a pattern means for generating an optical pattern, where the image processing unit is preconfigured to stitch the sub-images together to form the composite image by means of the optical pattern characterized in that (A) the optical pattern is generated with an incident wavelength and is emitted and captured with an emission wavelength that is different from the incident wavelength, (B) the pattern is captured in pattern images simultaneously with the capture of the sub-images, and the sub-images are free of the pattern, and (C) the pattern images determine the position of the sub-images in relation to each other by means of the location of the one pattern element in two pattern images.

22. The device according to claim 21, characterized in that the optical system comprises a pattern optical system, which is transmissive in a wavelength of the pattern image, and an object optical system, which is transmissive in a wavelength of the object image and is opaque in the wavelength of the pattern image.

* * * * *